United States Patent [19]

Dunwoody

[11] 4,046,398
[45] Sept. 6, 1977

[54] HIGH CLEARANCE VEHICLE HITCH

[76] Inventor: George O. Dunwoody, 62 E. 106th Place, North Glenn, Colo. 80233

[21] Appl. No.: 690,008

[22] Filed: May 26, 1976

[51] Int. Cl.² .................................................. B60D 1/16
[52] U.S. Cl. ............................................................. 280/415 R
[58] Field of Search ........... 280/415 A, 415 R, 490 R, 280/491 E, 495, 496, 497, 491 R, 500, 501, 511

[56] References Cited

U.S. PATENT DOCUMENTS

| | | | |
|---|---|---|---|
| 2,847,232 | 8/1958 | Graham | 280/490 R |
| 3,436,101 | 4/1969 | Hanson | 280/511 |
| 3,837,674 | 9/1974 | Rathsack | 280/415 A |

Primary Examiner—Robert R. Song
Assistant Examiner—R. Schrecengost
Attorney, Agent, or Firm—Ronald F. Weiszmann

[57] ABSTRACT

A vehicle hitch for use with a high clearance vehicle which provides a means by which trailers and the like may be hitched to the high clearance vehicle at either the clearance height of the high clearance vehicle or the clearance height of a conventional vehicle.

8 Claims, 3 Drawing Figures

HIGH CLEARANCE VEHICLE HITCH

BACKGROUND OF THE INVENTION

1. FIELD OF THE INVENTION

The present invention relates to a vehicle hitch for a high clearance vehicle, such as, for example, a four-wheel drive truck or recreational vehicle, wherein the vehicular hitch allows for the towing of a trailer or the like at varying heights.

2. PRIOR ART

Various adjustable vehicular hitches have been previously devised. U.S. Pat. Nos. 3,664,686 to Anderson; 3,692,330 to Kendall; and 3,922,006 to Borges, all disclose vertically adjustable vehicular hitches of various design. However, none of the hitches shown in these three patents meet the difficulties as will be subsequently described in this disclosure.

High clearance vehicles, such as four-wheel drive trucks and recreational vehicles, are often times used for the purpose of towing trailers, boats, mobile campers, and other similar devices. However, because of the height of such vehicles above the ground, many trailers and the like cannot be effectively towed with a hitch mounted to the high clearance vehicle at the height of the vehicular frame. Consequently, it is necessary to provide, for some uses, a hitch attached to the high clearance vehicle which is lower than the height of the vehicular frame. However, when such a lowered hitch is permanently attached to the vehicular frame of a high clearance vehicle, the purpose for which the vehicle is provided with high ground clearance is defeated for the reason that the effective ground clearance of the vehicle then becomes the height above the ground of the lowered vehicular hitch.

Whereas the above referenced patents disclose means of making a vehicular hitch vertically adjustable, all of those patents disclose a permanently and rigidly attached framework for the adjustable hitch, a part of which permanently remains at the lower most level of the vertically adjustable hitch.

SUMMARY OF THE INVENTION

The present invention discloses a vehicular hitch for a high clearance vehicle which provides a hitch mounting assembly at essentially the height of the vehicular frame as well as a hitch mounting assembly at a position generally vertically removed from the vehicular frame in a downward direction. In addition, the present invention discloses a vehicular hitch in which the lowered hitch mounting assembly may be simply and easily and completely removed from the higher hitch mounting assembly so as to insure full ground clearance of the high clearance vehicle when the lower vehicular hitch is not in use.

DESCRIPTION OF THE PREFERRED EMBODIMENT

Figure 1:
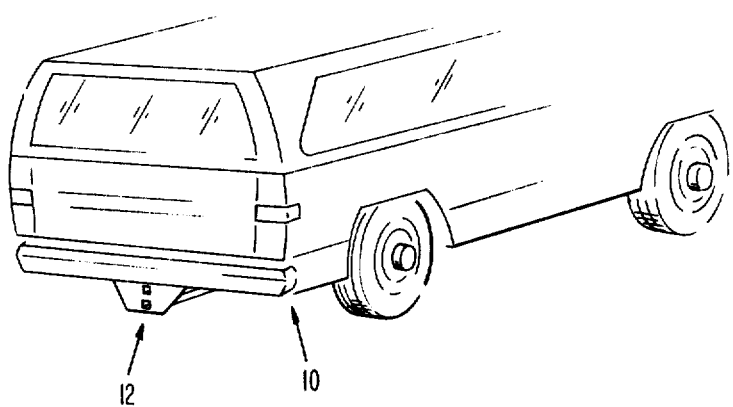
FIG. 1 is a schematic view of the vehicular hitch of the present invention in position on a high clearance vehicle.

Referring to the drawing and the numerals of reference therein, the hitch of the present invention is shown generally in FIG. 1 as it attaches to a high clearance vehicle 10, such as, for example, a fourwheel drive pick-up, a four-wheel drive recreational vehicle, or any other vehicle which for one reason or another provides high ground clearance. The vehicular hitch of the present invention, 12, will be described later in much greater detail with reference to FIGS. 2 and 3.

Figure 2:
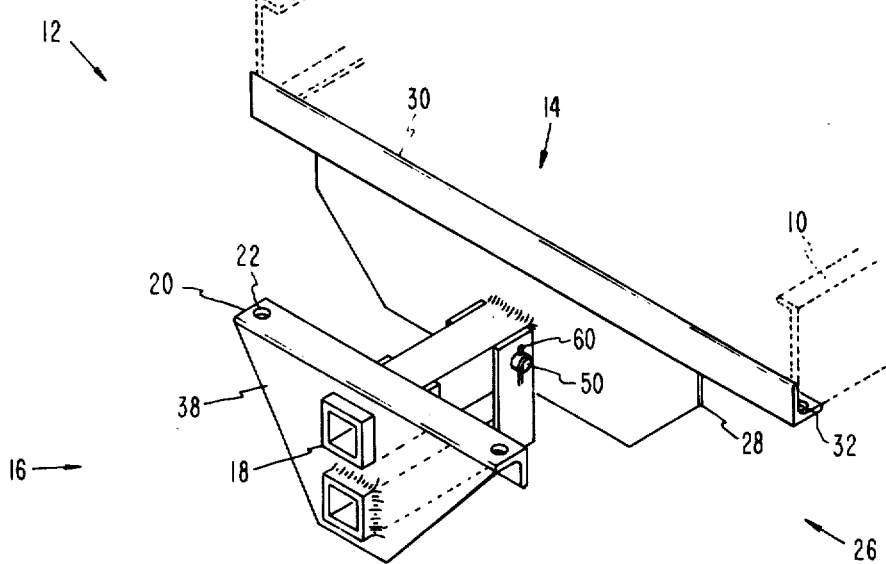
FIG. 2 is an isometric view of the vehicular hitch of the present invention.
Figure 3:
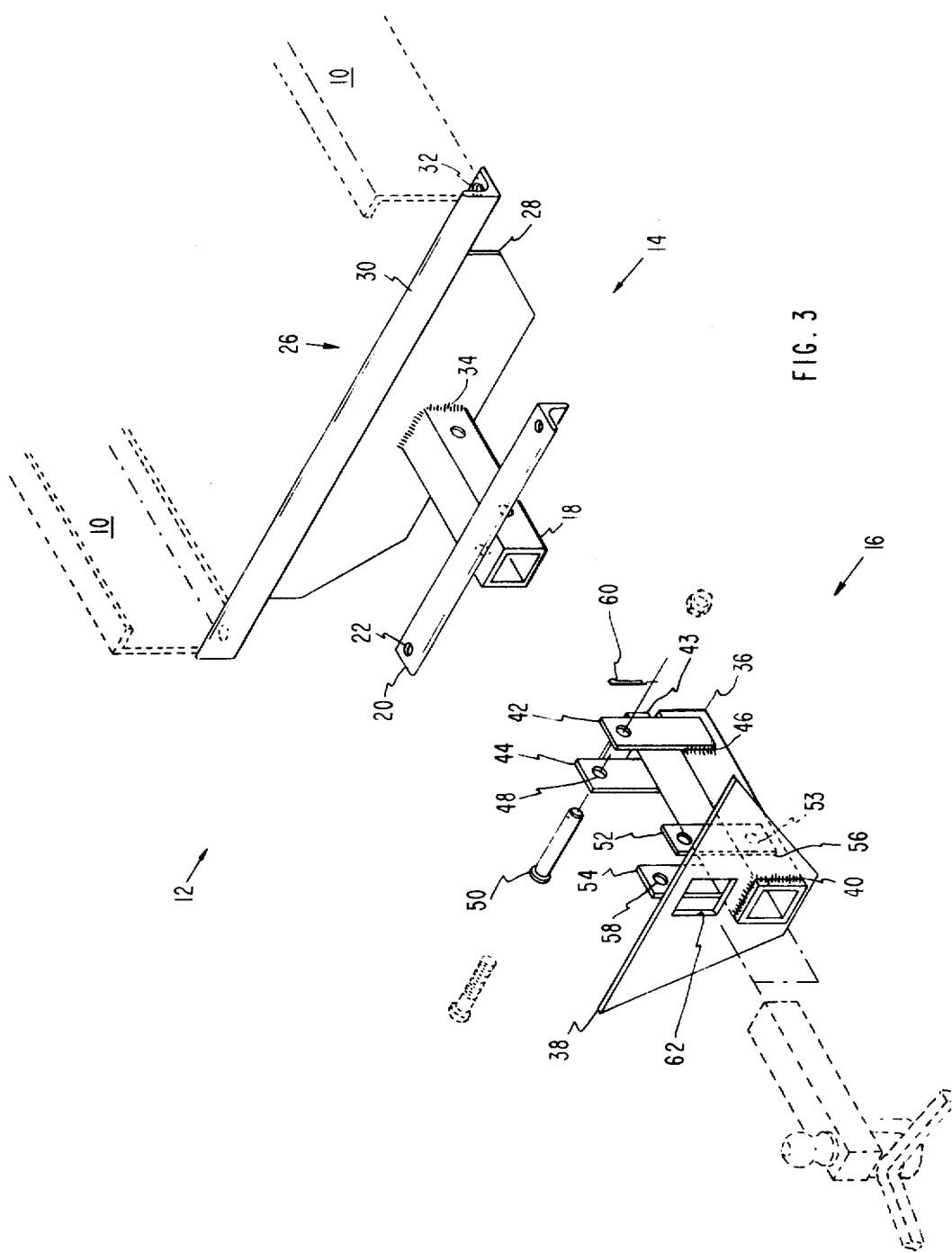
FIG. 3 is an isometric view of the vehicular hitch of the present invention with the lower hitch mounting assembly removed from the higher hitch mounting assembly.

As shown in FIGS. 2 and 3, the vehicular hitch 12 comprises a first hitch assembly 14 and a second hitch assembly 16. FIG. 2 depicts the first hitch assembly 14 and the second hitch assembly 16 assembled together. In this configuration, the second hitch assembly 16 would preferably receive a hitch, such as a ball hitch, which is shown by dotted line only, for the towing of a trailer, boat, or the like at the lower position as will be described later in further detail. FIG. 3 depicts the second hitch assembly 16 detached and removed from the first hitch assembly 14. In this configuration, the first hitch assembly 14 would generally receive a hitch for towing a trailer, boat, or the like, at the higher level generally corresponding to the level of the frame of vehicle 10, as will also be described later in greater detail.

As shown in FIGS. 2 and 3, the first hitch assembly 14 comprises a tubular rectangular cylinder 18. At a first end of the tubular rectangular cylinder 18 is attached a first support 20 extending perpendicular to the tubular rectangular cylinder 18. The first support 20 is permanently secured to the tubular rectangular cylinder 18, for example, by welding, and includes a mounting hole 22 at either end thereof for attachment directly to the vehicle 10. Further, attached to the opposite end of the tubular rectangular cylinder 18 is a second support 26. The second support 26 comprises a metal plate 28 running perpendicular to the tubular rectangular cylinder 18 and welded thereto as shown at 34. Attached to the plate 28 is a support angle 30 containing mounting holes 32 at either end thereof with which the second support 26 is mounted directly to the vehicle 10.

The second hitch assembly 16 comprises a second tubular rectangular cylinder 36 of essentially the same length as the first tubular rectangular cylinder 18. Secured to a first end of the second tubular rectangular cylinder 36 is a trapezoidal plate 38. A first end of the second tubular rectangular cylinder 36 protrudes through a trapezoidal plate 38 and is permanently secured thereto by welding as shown at 40. As can be seen from the drawings, the trapezoidal plate 38 is perpendicular to the second tubular rectangular cylinder 36 and generally extends upwardly in a verticle direction from the second tubular rectangular cylinder 36. Perpendicularly extending metal plates 42, 44, 52 and 54 are permanently secured to the second tubular rectangular cylinder 36 by welding as shown at 46 and 56. Plates 42 and 44 are grouped as are plates 52 and 54 to form means for attaching the second hitch assembly 16 to the first hitch assembly 14. Each set of the plates 42, 44 and 52, 54 include mounting holes 48 and 58 at an upper end for detachably mounting to the first tubular rectangular cylinder 18. Although mounting of plates 42, 44, 52 and 54 to the first tubular rectangular cylinder 18 may be done by a variety of means, a preferred means as shown in the drawings is a pin and cotter key as shown at 50 and 60. A stiffener plate 43 may be secured to plates 42 and 44 to add strength to the assembly. Additionally, plates 52, 54 include a mounting hole 53 at the point where plates 52 and 54 attach to the second tubular rectangular cylinder 18, the purpose of which will be discussed later.

As further shown by FIGS. 2 and 3, trapezoidal plate 38 includes a rectangular opening 62 vertically aligned with the point of attachment of the trapezoidal plate 38 to the second tubular rectangular cylinder 36. Rectangular opening 62 is so positioned that, as shown in FIG. 2, when the second hitch assembly 16 is secured to the first hitch assembly 14, the first tubular rectangular cylinder 18 protrudes through rectangular opening 62 to both insure the accessibility of the first tubular rectangular cylinder 18 for attachment of a hitch as will be discussed later, as well as to increase the rigidity of the vehicular hitch 12 as a whole.

As has been previously discussed, both the first tubular rectangular cylinder 18 and the second tubular rectangular cylinder 36 are adapted to receive a hitch, of any standard design and which do not constitute a significant part of this invention. A typical hitch is shown in dotted line only. Standard hitches which may be used with the present invention, and all of which are adapted to fit into a rectangular holder such as the first tubular rectangular cylinder 18 or the second tubular rectangular cylinder 36 include a ball type hitch for use with relatively light loads and hitches for use with heavier loads which include stabilizer mechanisms, among others. The hitch may be secured in either hitch mounting assembly 16 or 18 by the use of either mounting hole 58 or mounting hole 53.

In operation, the vehicular hitch of the present invention as shown in FIGS. 2 and 3 is secured directly to a high clearance vehicle 10 as shown in FIG. 1. With the second hitch assembly 16 attached to the first hitch assembly 14, as previously described, a high clearance vehicle has been adapted to tow a load, such as a trailer, boat, or other similar device, either at the vehicle height by using the first hitch assembly 14 or at a lower elevation by using the second hitch assembly 16. The level of the second hitch assembly 16 is designed to generally correspond with the vehicle height of a standard vehicle, such as a passenger car or a non four-wheel drive pick-up. It is often necessary to tow a load at the elevation of the second tubular rectangular cylinder 36 rather than at the elevation of the first tubular rectangular cylinder 18 due to the manner in which the trailer, boat, or other device to be towed is constructed. Frequently, such devices to be towed are two wheeled structures, with the weight of the trailer, boat, or the like, distributed in such a way that the device may only be towed safely when the device is maintained at a level elevation. Consequently, in such circumstances, to attempt to attach such a towed vehicle to a hitch at the elevation of the first tubular rectangular cylinder 18 would cause the weight of the towed device to be improperly distributed and thereby creating an unsafe situation.

On the other hand, certain loads and devices to be towed may be hitched to the towing vehicle at the elevation of the first tubular rectangular cylinder 18 without difficulty. The hitch of the present invention provides the opportunity to place a hitch at either elevation as required.

Further, when the device being towed may be attached at the higher elevation, or when the vehicle 10 is not towing any vehicle, the second hitch assembly 16 may be completely removed from the vehicle in question to avoid any low hanging structure which might interfere with the ground clearance provided by the high clearance vehicle 10.

What is being claimed is:

1. A vehicular hitch for use with a high clearance vehicle and having multiple hitch placements comprising:
   a. a first hitch assembly rigidly attached to a vehicular frame and positioned at essentially the height of said vehicular frame;
   b. said first hitch assembly comprising a first tubular rectangular cylinder adapted to receive a hitch and a first support securing a first end of said first tubular rectangular cylinder to the said vehicular frame and a second support securing a second end of said first tubular rectangular cylinder to said vehicular frame;
   c. a second hitch assembly removably attached to said first hitch assembly and positioned generally vertically removed from said first hitch assembly in a downward direction;
   d. said second hitch assembly being removable in such a way that upon removal of said second hitch assembly, essentially no part of said vehicular hitch extends vertically below said first hitch assembly; and
   e. said second hitch assembly comprising a second tubular rectangular cylinder adapted to receive a hitch and a plate secured to a first end of said second tubular rectangular cylinder and containing an opening therethrough adapted to interact with said first end of said first tubular rectangular cylinder.

2. A vehicular hitch as claimed in claim 1 wherein:
   a. said plate secured to said first end of said second tubular rectangular cylinder is trapezoidal in shape.

3. A vehicular hitch as described in claim 1 wherein the hitch received by the first tubular rectangular cylinder is a ball hitch.

4. A vehicular hitch as described in claim 1 wherein the hitch received by the first tubular rectangular cylinder is a hitch utilizing a stabilizer.

5. A vehicular hitch as described in claim 1 wherein the hitch received by the second tubular rectangular cylinder is a ball hitch.

6. A vehicular hitch as described in claim 1 wherein the hitch received by the second tubular rectangular cylinder is a hitch utilizing a stabilizer.

7. A vehicular hitch as described in claim 1 wherein the second hitch assembly is removably attached to the first hitch assembly by a multiplicity of removable pins.

8. A vehicular hitch as described by claim 7 wherein the removable pins are threaded bolts.

* * * * *